United States Patent [19]

Hietaranta

[11] 4,365,519

[45] Dec. 28, 1982

[54] ADJUSTABLE SPRING UNIT FOR USE IN FORCE MEASURING APPARATUS

[75] Inventor: Matti Hietaranta, Nattari, Finland

[73] Assignee: Valmet Oy, Finland

[21] Appl. No.: 183,095

[22] Filed: Aug. 27, 1980

Related U.S. Application Data

[63] Continuation-in-part of Ser. No. 18,833, Mar. 8, 1979, abandoned.

[30] Foreign Application Priority Data

Mar. 9, 1978 [FI] Finland ................................. 780753

[51] Int. Cl.$^3$ ............................................... G01L 1/04
[52] U.S. Cl. .................................................. 73/862.52
[58] Field of Search ................ 73/862.22, 862.52, 711; 267/175, 177

[56] References Cited

U.S. PATENT DOCUMENTS

| | | | |
|---|---|---|---|
| 836,811 | 11/1906 | Kennebrew | 267/177 X |
| 2,953,016 | 9/1960 | Seitz, Jr. | 73/60 |
| 2,956,052 | 11/1960 | Alexander et al. | 73/189 |

*Primary Examiner*—Charles A. Ruehl
*Attorney, Agent, or Firm*—Steinberg & Raskin

[57] ABSTRACT

A spring unit for use in force measuring apparatus, the unit being adapted to present an adjustable spring constant so as to be useful for measuring directional forces of widely different magnitudes imparted thereon. The spring unit includes a ring-shaped member adapted to be rotatably connected to the fixed frame of measuring apparatus about an axis of rotation in a manner such that the rotational position of the ring-shaped member can be selectively adjusted to a particular position, a hub member disposed within the ring-shaped member, and spring apparatus interconnecting the ring-shaped member and the hub member. The effective spring constant of the measuring unit is selectively adjustable through the rotation thereof about its axis of rotation so that the unit can effectively function within selected varying ranges of forces to be measured. A force proportional to the force to be measured is imparted to the hub member which is displaced within the ring-shaped member over a distance which is inversely proportional to the selected effective spring constant of the measuring unit. The amount of displacement of the hub member is measured by a transducer whose output is proportional to the force to be measured.

8 Claims, 8 Drawing Figures

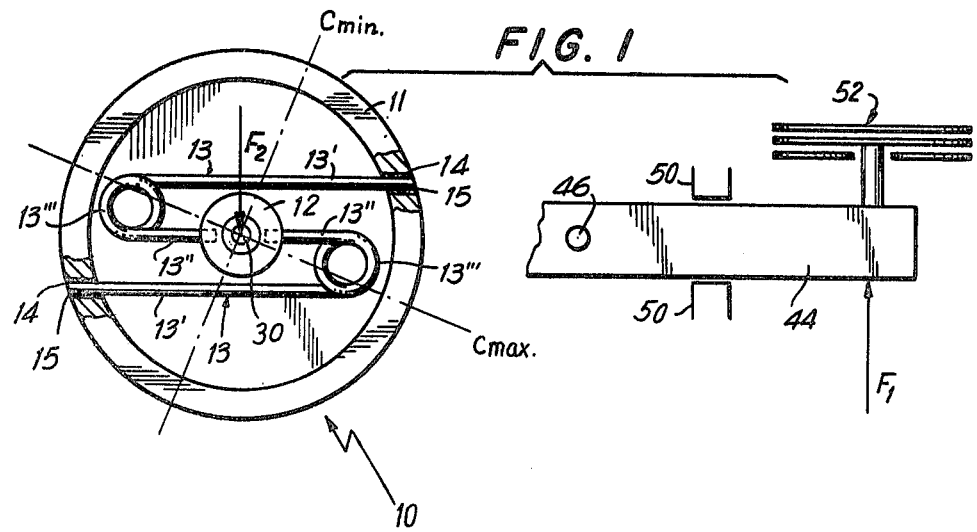
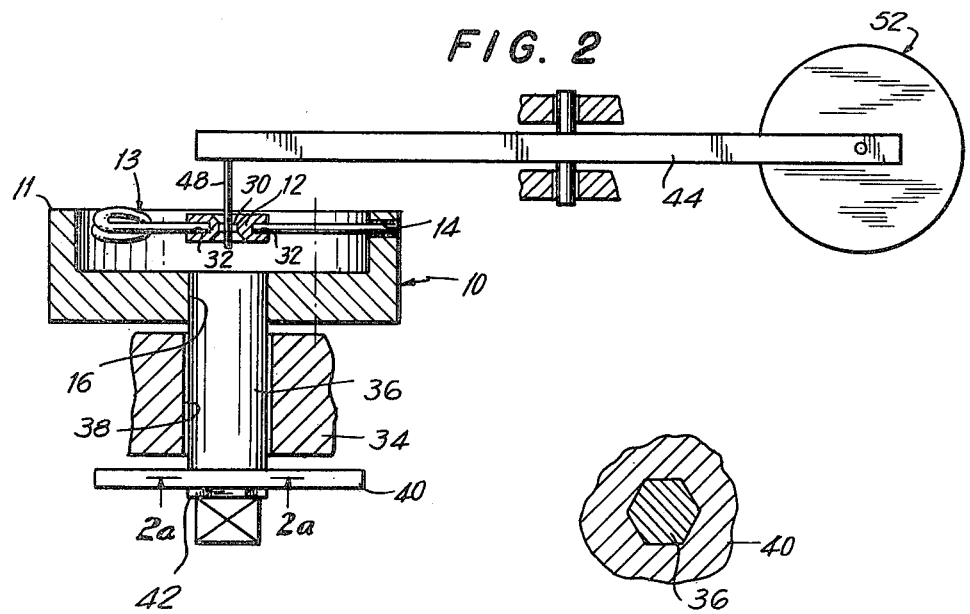

ADJUSTABLE SPRING UNIT FOR USE IN FORCE MEASURING APPARATUS

This application is a continuation-in-part of application Ser. No. 18,833 filed Mar. 8, 1979, now abandoned.

BACKGROUND OF THE INVENTION

This invention relates generally to a measuring spring unit adapted to be incorporated in force measuring apparatus, the unit being arranged so as to have a directional force imparted thereto and, more particularly, to such a measuring spring unit which is selectively adjustable so as to be operable to measure forces within various different ranges.

Measuring instruments adapted to measure directional forces imparted thereto at selected measuring points in various industrial processes are well known. Thus, a measuring force is generally transmitted from the object being measured to the measuring instrument in a manner such that the measuring force received by the measuring instrument is then converted to a pneumatic or electrical measurement indication.

In this connection, it is often required to measure forces of different orders of magnitude, i.e., forces falling within ranges which are widely disparate from each other. In order to accommodate this condition, conventional measuring instruments have been provided with the capability of adjusting the extent of the range of forces which can be measured. Such provisions usually take the form of elaborately balanced lever arrangements having at least one adjustable lever ratio. However, these arrangements which are incorporated in conventional measurement apparatus of this type have not been found to be entirely satisfactory in that such lever arrangements are generally relatively elaborate, complicated, and require frequent adjustment.

SUMMARY OF THE INVENTION

Accordingly, one object of the present invention is to provide a new and improved measuring spring unit for use in force measuring apparatus adapted to measure varying forces which fall within ranges which are widely disparate from each other.

Another object of the present invention is to provide such a new and improved force measuring unit having a less complicated construction and being more reliable than conventional units without the necessity of elaborate balanced and complex lever arrangements.

Still another object of the present invention is to provide such a new and improved force measuring unit comprising a spring measuring unit having an effective spring constant which is selectively adjustable.

Briefly, in accordance with the present invention, these and other objects are attained by providing a spring measuring unit including a ring-shaped member, a hub member located within the ring-shaped member adapted to have a directional force proportional to the force to be measured imparted thereto, and spring structure interconnecting the ring-shaped member and the hub member. The spring unit is rotatably mounted, preferably on the frame of the measuring apparatus, so as to be selectively fixed in one of several angular orientations with respect to the direction of the force imparted to the hub member. The spring structure is such that for differing angular orientations of the spring unit, the resisting force presented by the spring structure to the movement of the hub member under the action of the directional force imparted thereto will correspondingly differ. Stated another way, the effective spring constant presented by the spring structure is determined by the particular angular orientation of the spring unit. Since the extent of movement of the hub member under the action of the directional force imparted thereto, which itself is measured by a transducer, is inversely proportional to the selected value of the effective spring constant, the apparatus incorporating the spring measuring unit is capable of measuring forces having widely different magnitudes by rotating the unit into an appropriate position.

DESCRIPTION OF THE DRAWINGS

A more complete appreciation of the invention and many of the attendant advantages thereof will be readily understood by reference to the following description when taken in connection with the accompanying drawings in which:

FIG. 1 is a plan view of one embodiment of the spring-type measuring unit of the present invention illustrated in connection with other elements of force measuring apparatus, one of such elements being broken away;

FIG. 2 is a side elevation view of the apparatus illustrated in FIG. 1;

FIG. 2a is a section view taken along line 2a—2a of FIG. 2;

DESCRIPTION OF THE PREFERRED EMBODIMENTS

Figure 3A:
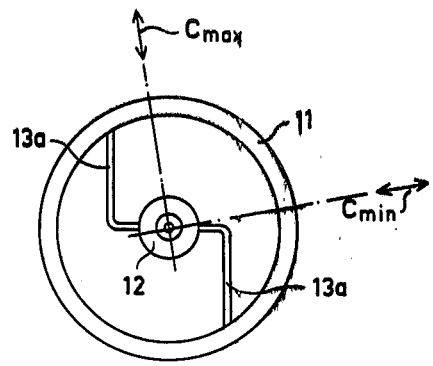
FIGS. 3a–3d illustrate additional embodiments of the measuring spring structure of the spring-type measuring unit of the present invention.

Referring now to the drawings wherein like reference characters designate identical or corresponding parts throughout the several views and, more particularly to FIGS. 1 and 2 thereof, a spring-type measuring unit according to the present invention, generally designated 10, is illustrated in conjunction with other components of force measuring apparatus in which the unit 10 is incorporated. The measuring spring unit 10 includes a ring-shaped member 11 having a generally cup-shaped configuration as best seen in FIG. 2. A central opening 16 is formed through the bottom wall thereof to provide means for rotatably connecting the ring-shaped member 11 to the fixed frame of the measuring apparatus by a suitable shaft and bearing assembly, described hereinbelow. A disk-shaped hub member 12 is normally centrally disposed within the ring-shaped member 11. The hub member 12 has an inwardly tapering central region defining a central opening 30 which passes therethrough. Interconnecting the ring-shaped member 11 and hub member 12 and normally maintaining the latter substantially centrally within the circular space defined by the ring-shaped member is spring structure, described below.

In the embodiment illustrated in FIGS. 1 and 2, the spring structure comprises a pair of measuring springs 13 of the torsion type, each such torsion spring being defined by a pair of end portions 13', 13", and an integral helical portion 13'''. The side wall of ring-shaped member 11 is provided with slots 14 in which the free terminal end regions of the spring end portions 13', 13' of the respective springs 13 are fixed by conventional means, such for example, as by tin soldering 15. The free terminal end regions of the other pair of spring end portions 13'', 13'', are correspondingly received and affixed within radial slots 32 formed in the hub member 12.

Referring to FIG. 2, the spring unit 10 is rotatably mounted to a fixed frame 34, preferably the frame of the measuring apparatus, by means of a shaft 36 having one end fixed within the opening 16 of the ring-shaped member 11 and whose shank passes through an opening 38 formed in frame 34. A disk 40 is fixed for rotation with the other end of shaft 36 while being axially movable over the same. Thus, as seen in FIG. 2a, the end of shaft 36 over which the disk 40 is provided has a hexagonal cross-section while disk 40 has a correspondingly shaped opening which receives the same. A nut 42 is provided at the outer end of shaft 36. When nut 42 is loose as shown in FIG. 2 i.e., when nut 42 is not urging disk 40 into frictional engagement with frame 34, the shaft 36 and spring unit 10 can be rotated about the axis of shaft 36. The spring unit 10 can, however, be fixed in any desired angular orientation by tightening nut 42 whereupon the inwardly facing surfaces of the disk 40 and ring-shaped member 11 will bear against respective surfaces of frame 34 to fix the spring unit 10 in the desired position.

Turning again to FIGS. 1 and 2, the spring unit 10 is shown in conjunction with other components of force measuring apparatus. In the illustrated embodiment, the measuring apparatus comprises a lever 44 which is pivotally mounted by a stub shaft 46 on another part of the fixed frame 34 for rotation in a plane parallel to the plane in which the hub member 12 is situated. The force to be measured, designated $F_1$ (FIG. 1), is adapted to be applied to one end of lever 44 which tends to rotate the latter about shaft 46. A pin 48 is fixed on the other end of lever 44. In the unstressed condition, i.e., when $F_1=0$, the lever 44 is situated such that pin 48 will pass through the opening 30 in hub member 12 while the latter is in its central position as shown in FIGS. 1 and 2. A displacement transducer, which may comprise a capacitive displacement transducer 52, is operatively associated with lever 44 for measuring the displacement thereof by conventional electronic circuitry. A pair of movement limiting stops 50 (FIG. 1) are located on either side of lever 44 in the plane of rotation thereof to prevent inadvertent undue movement of the same which might damage the transducer.

In operation, with the force to be measured $F_1$ acting on lever 44, a directional force $F_2$ proportional to $F_1$ will act on hub member 12, the magnitude of $F_2$ depending on the particular location of stub shaft 46. The hub member 12 will move under the action of force $F_2$ an amount equal to $F_2/C$, where C is the effective spring constant presented by the spring structure 13. The transducer 52 will of course have an output indicative of the extent of displacement of hub member 12.

According to an important feature of the present invention, the effective spring constant C provided by the spring structure and, therefore, the sensitivity of spring unit 10, can be varied depending upon the anticipated magnitude of the force to be measured. This is extremely advantageous in that it will not be necessary to replace the transducer 52 even when the forces to be measured vary from relatively small to relatively large. More particularly, if it is desired to change the sensitivity of the spring unit 10, it is only necessary to rotate the unit 10 by loosening nut 42, rotating the disk 40 an appropriate amount and then retightening nut 42. In this connection, the effective spring constant of the spring structure varies between a maximum $C_{max}$ and a minimum $C_{min}$ when the spring unit is rotated through an angle of about 90°. Thus, as seen in FIG. 1, if it is anticipated that the force to be measured, $F_1$, will be relatively large, it is then desirable to reduce the sensitivity of spring unit 10. This may be accomplished by rotating the unit 10 in the manner described above until the line of the force $F_2$ aligns with the imaginary line $C_{max}$. In this position, the spring structure will present a maximum effective spring constant. Alternatively, for small forces, the spring unit 10 can be rotated until the line of the force $F_2$ aligns with the imaginary line $C_{min}$ whereupon the spring structure will present a minimum spring constant. Of course, the spring unit can be located at intermediate positions whereupon the effective spring constant of the unit will be between $C_{max}$ and $C_{min}$.

The outwardly facing surface of disk 40 is preferably provided with graduations which are adapted to be aligned with a fixed marker provided on frame 34 in order to allow an operator to appropriately set the angular orientation of spring unit 10 to present an appropriate spring constant.

Referring now to FIGS. 3a–3d, additional embodiments of the spring structure 13 are illustrated. In the embodiment of FIG. 3a, the spring structure 13 comprises a pair of identical measuring spring members 13a, 13a, each of which is formed of integral portions extending substantially at right angles with respect to each other. Each spring member 13a interconnects the ring-shaped member 11 and the hub member 12 in a manner similar to that described above in connection with FIGS. 1 and 2. In this embodiment, the maximum and minimum values $C_{max}$ and $C_{min}$, respectively, of spring constant C of the measuring spring structure 13 are obtained upon the unit being oriented so that the forces are directed along the arrows designated $C_{max}$ and $C_{min}$, respectively. Of course, it is understood that when the unit is oriented so that the direction of the force to be measured is substantially aligned with the arrow $C_{max}$, the range of forces measurable thereby is large while upon orientation of the unit so that the direction of the force to be measured is substantially aligned with the arrow $C_{min}$, the range of forces measurable thereby is relatively small. In this embodiment, the angle between the maximum and minimum values of the spring constant is substantially 90°.

Figure 3B:
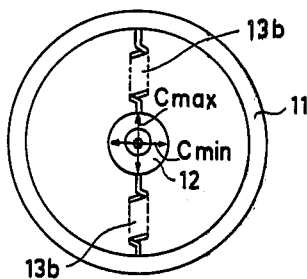

Referring to FIG. 3b, the measuring spring structure 13 comprises a pair of helical springs 13b, 13b each of which interconnects the ring-shaped member 11 and the hub member 12 in a manner similar to that described above in connection with FIGS. 1 and 2. In this embodiment, the axes of the spring members are substantially colinear.

Figure 3C:
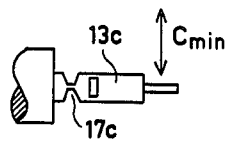
Figure 3D:
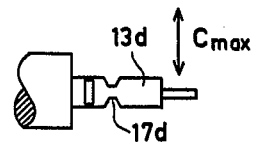

In the embodiment illustrated in FIGS. 3c and 3d, the measuring spring structure 13 comprises measuring springs 13c, 13d, respectively, in which grooves 17c and 17d are formed, respectively. The maximum and minimum values $C_{max}$, $C_{min}$, of the spring constant are obtained in their direction illustrated by arrows $C_{max}$ and $C_{min}$.

Figure 4:
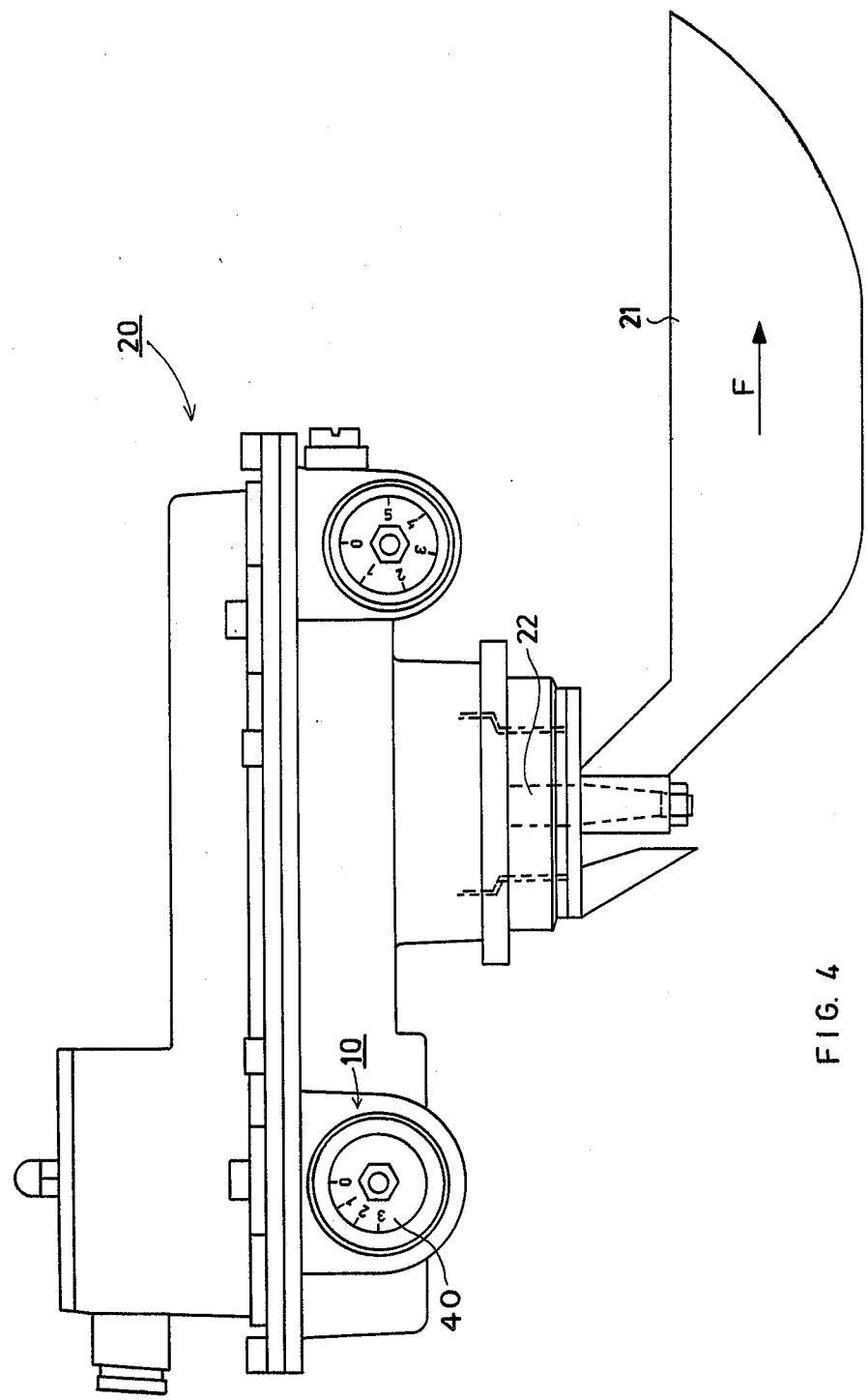
FIG. 4 is a schematic side view of a measuring instrument incorporating the spring-type measuring unit of the present invention, the measuring instrument being specifically adapted for measuring the consistency of pulp flow.

Referring now to FIG. 4, the spring-type measuring unit 10 according to the present invention is illustrated in connection with a force measuring instruction 20 specifically adapted for measuring the consistency of a pulp stock flow. The consistency of the pulp flow is sensed by a conventional sensor 21 provided with a rotating center 22. In operation, the pulp flow exerts a rotational torque on sensor 21 which is transmitted, such for example as by the lever system described above to the hub member 12 of the measuring unit 10. Thus, a force ($F_2$) determined by the consistency of the pulp flow, is impressed on the hub member 12 which thereby is moved against the resisting force of the spring structure a certain distance in the direction of the force. The transducer has an output signal indicative of the extent of movement so that since the effective spring constant of unit 10 is known by reading the gradations on dial 40, the force to be measured can be obtained. Should the consistency of the pulp flow vary, the force impressed on the hub member 12 will change in a proportionate manner, thereby changing the extent to which the hub member 12 moves.

As explained in detail above, the ring-shaped member 11 can be manually rotated about its axis thereby changing the spring constant C of the measuring spring structure 13. In this manner, the sensitivity of the movement of the hub member 12 is suitably adjusted.

Obviously, numerous modifications and variations of the present invention are possible in the light of the above teachings. Accordingly, it is to be understood that within the scope of the appended claims the invention may be practiced otherwise than specifically described herein.

What is claimed is:

1. In force measuring apparatus, a unit for measuring a directional force, said unit having an adjustable effective spring constant so that the unit can operate in varying ranges of the forces to be measured, comprising:

a ring-shaped member adapted to be rotatably connected to a fixed frame about an axis of rotation in a manner such that the rotational position of said ring-shaped member is selectively adjustable with respect to said fixed frame;

a hub member disposed within said ring-shaped member for movement with respect thereto, said hub member being arranged so as to be receivable of a directional force proportional to the force to be measured; and spring means interconnecting said ring-shaped member and said hub member in a manner so as to resist movement of said hub member under the action of the directional force received thereby, whereby the effective spring constant presented by said spring means is selectively adjustable between a maximum value and a minimum value by selectively rotating said unit about the axis of rotation, and such that upon the directional force being imparted to said hub member, the latter will move within said ring-shaped member in the direction of said force over a distance which is inversely proportional to the selected spring constant of said spring means.

2. The combination recited in claim 1 wheren said spring means comprises a pair of measuring springs, each of said measuring springs interconnecting said ring-shaped member and said hub member in a manner such that the rotation of said hub member with respect to said ring-shaped member is substantially prevented.

3. The combination recited in claim 2 wherein each of said measuring spring comprises a torsional spring defined by a pair of end portions and an integral helical portion.

4. The combination recited in claim 2 wherein each of said measuring springs comprises a pair of integrally formed portions extending substantially at right angles with respect to each other.

5. The combination recited in claim 2 wherein each of said measuring springs comprises a helical spring.

6. The combination recited in claim 2 wherein each of said measuring springs includes a groove formed therein.

7. The combination recited in claim 1 wherein said spring means are located so that upon rotating said ring-shaped member over an angle of about 90°, the effective spring constant of said measuring unit varies between the maximum and minimum values thereof.

8. The combination recited in claim 1 further including indicia means connected to the axis of rotation of said ring-shaped member for indicating the angular orientation thereof.

* * * * *